Figure 1:
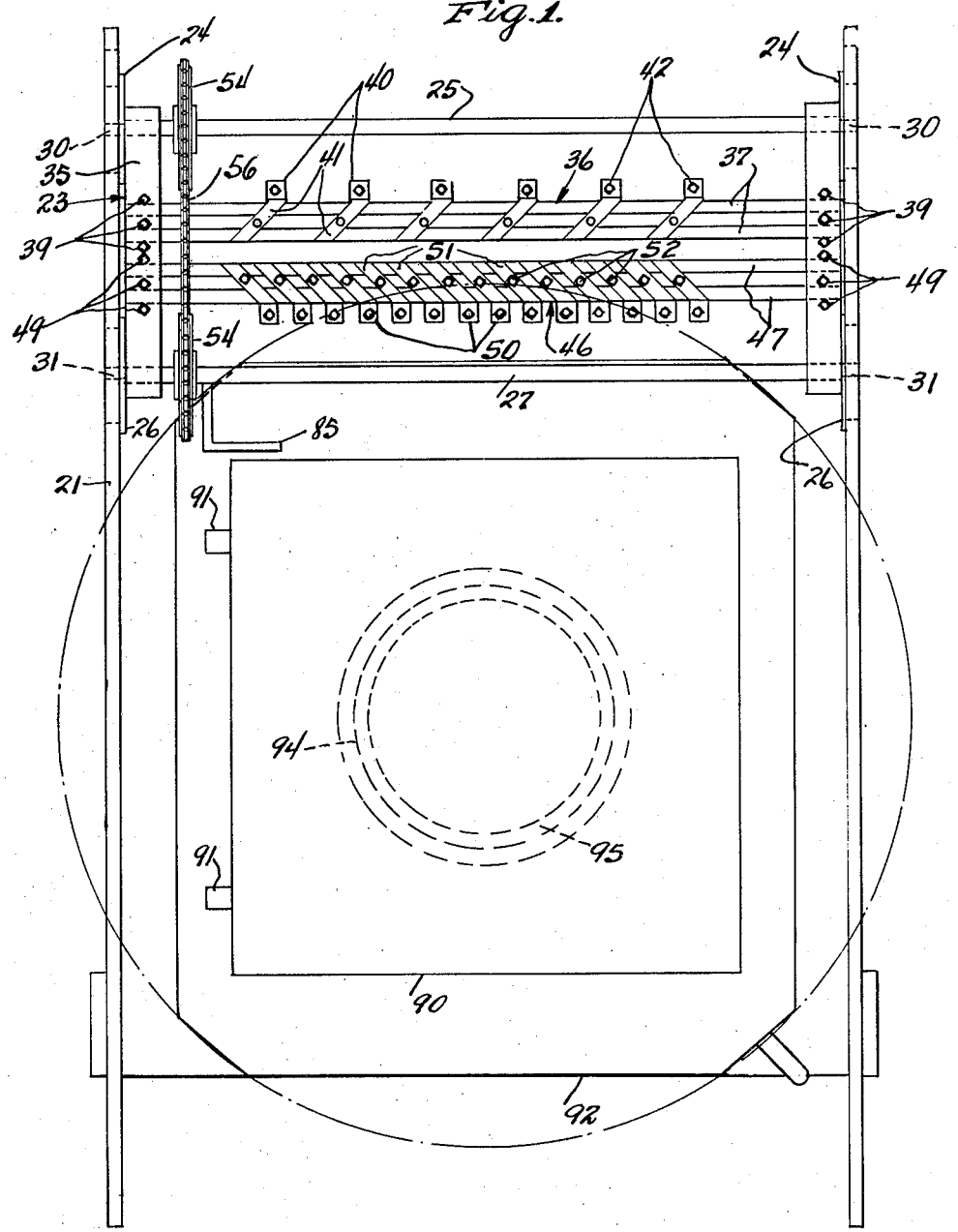

May 29, 1945.  W. OWEN  2,377,098

DOUBLE ACTING GLASS CUTTER

Filed Jan. 28, 1944  4 Sheets-Sheet 2

Inventor
WILLIAM OWEN

By Olen E. Bee
Attorney

May 29, 1945.　　　　W. OWEN　　　　2,377,098
DOUBLE ACTING GLASS CUTTER
Filed Jan. 28, 1944　　　　4 Sheets-Sheet 3
Fig. 4.　　　Fig. 5.　　　Fig. 6.
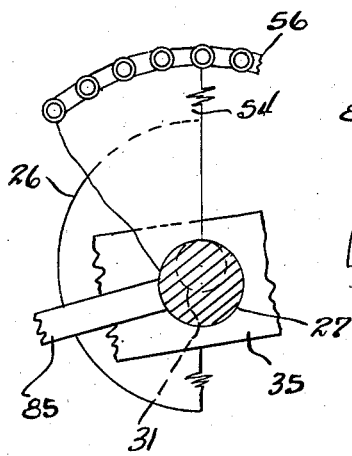
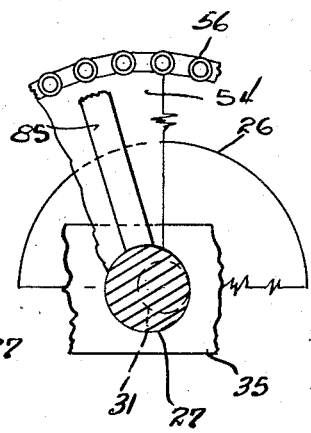
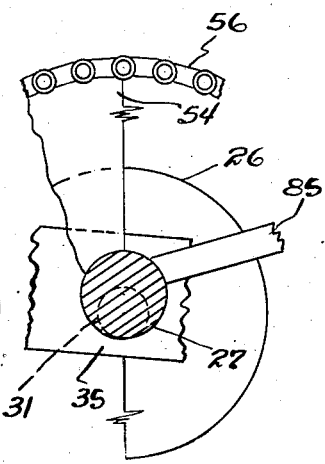
Fig. 7.
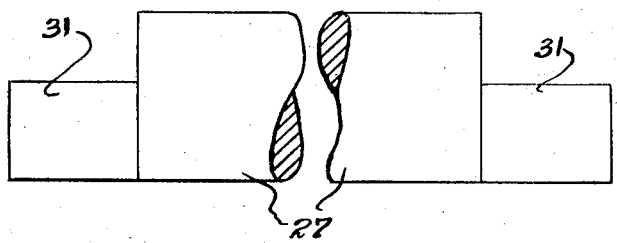
Inventor
WILLIAM OWEN
By Olen E. Bee
Attorney

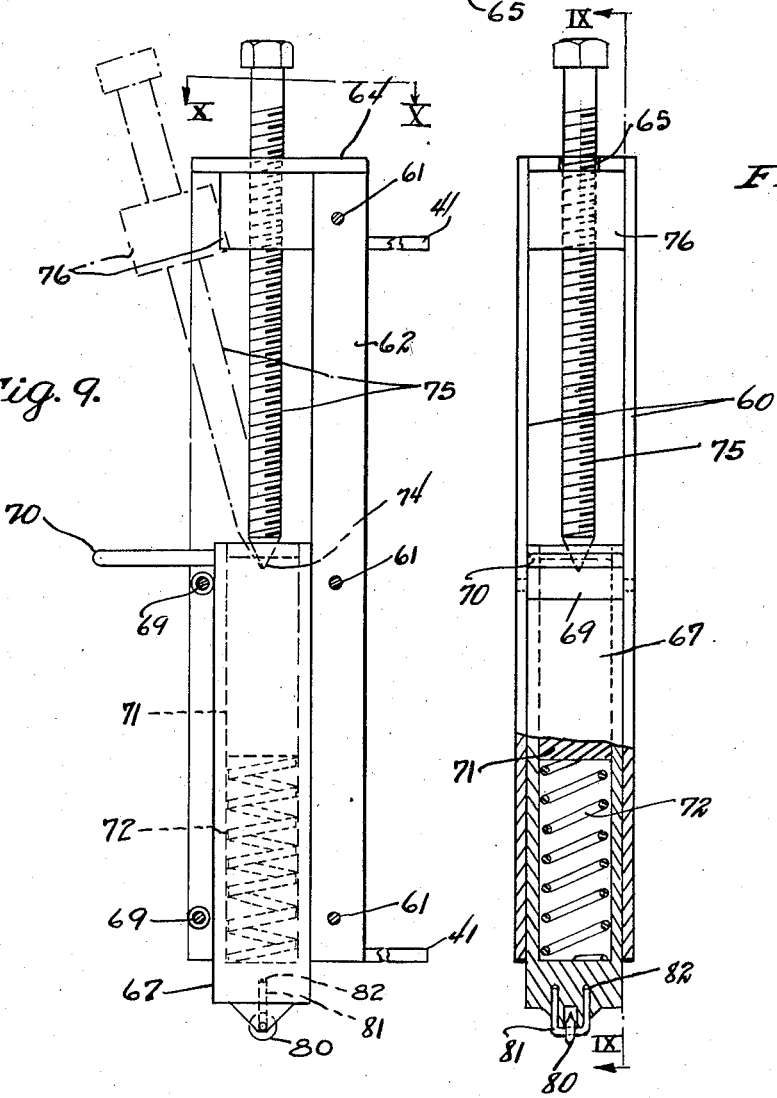

Patented May 29, 1945

2,377,098

UNITED STATES PATENT OFFICE 2,377,098

DOUBLE-ACTING GLASS CUTTER

William Owen, Pittsburgh, Pa., assignor to Pittsburgh Plate Glass Company, Allegheny County, Pa., a corporation of Pennsylvania Application January 28, 1944, Serial No. 520,031

6 Claims. (Cl. 33—32)

This invention relates to cutting apparatus and it has particular relation to a carriage or bridge type of cutter unit for making multiple cuts on sheet glass.

One object of the invention is to provide an improved cutting apparatus for cutting sheet glass into rectangular pieces of such dimensions as may be required.

Another object of the invention is to provide an improved two-way carriage adapted to cut glass into multiple pieces.

Another object of the invention is to provide an improved interchangeable cutting mechanism for multiple cutting apparatus.

In one form of the invention two rows of cutters are mounted upon a carriage which is adapted to travel over a sheet of glass properly supported for the operation of the cutters thereon. The rows of cutters are spaced and are relatively movable toward and away from the glass. By operating a handle either row of cutters can be lowered to the glass while the other row of cutters is concurrently raised. When one row of cutters contacts the glass the carriage is moved on the track to score the glass along a series of parallel lines. Upon completion of the first cutting stroke, the glass is turned 90° in its plane and the other row of cutters is then lowered and the glass is cut across the first scored lines by reverse movement of the carriage.

Figure 2:
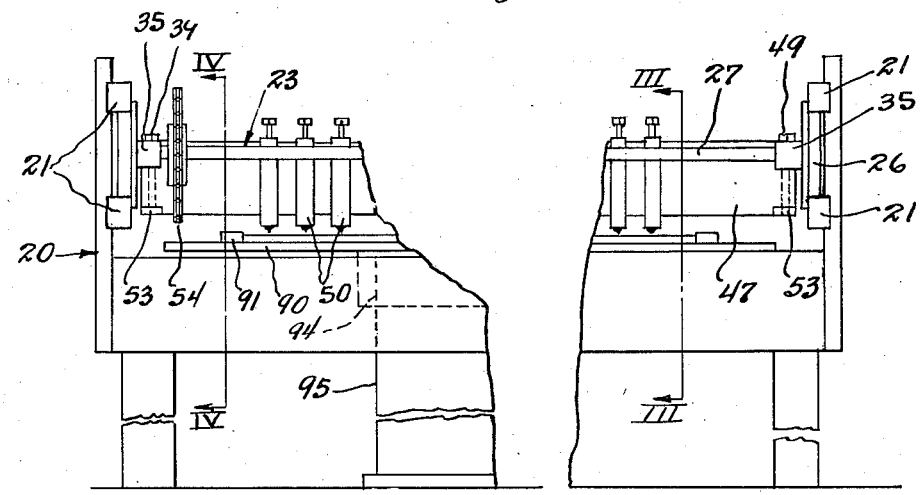
Figure 3:
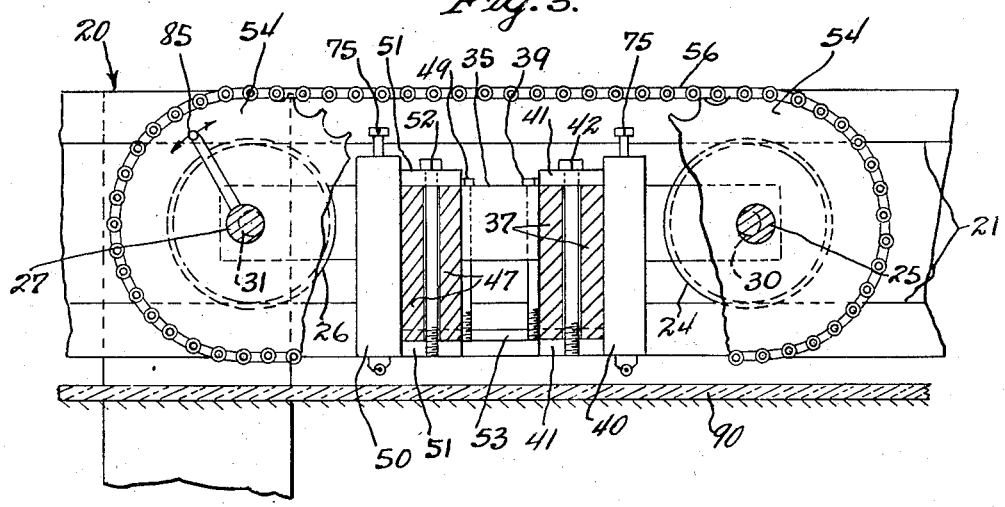

In the drawings:

Fig. 1 is a plan of an apparatus in which the invention has been incorporated; Fig. 2 is a fragmentary end elevation of the apparatus shown in Fig. 1; Fig. 3 is a fragmentary vertical section, on a larger scale, taken substantially along the line III—III of Fig. 2; Figs. 4, 5, and 6 are similar fragmentary vertical sections, on a larger scale, each taken substantially along the line IV—IV of Fig. 2, and illustrating successive positions of operating parts of the apparatus; Fig. 7 is a fragmentary plan of an eccentric shaft included in the apparatus; Fig. 8 is a partial front elevation of a cutter unit with portions thereof broken away and shown in vertical section; Fig. 9 is a vertical section taken substantially along the line IX—IX of Fig. 8; and Fig. 10 is a partial plan of the unit shown in Fig. 8 with an upper element shown in horizontal section.

In practicing the invention a unitary supporting frame 20 is provided with parallel upper and lower stationary tracks 21 for supporting a horizontally movable bridge cutter or carriage 23 which includes a forward pair of flanged wheels 24 connected by a horizontal shaft 25 and a rearward pair of flanged wheels 26 connected by a horizontal shaft 27 parallel to the first shaft. The wheels 24 and 26 fit sufficiently closely between tracks 21 on each side of the frame to prevent the carriage from being displaced vertically. The wheels 24 are rotatably mounted upon coaxial eccentric bearing extensions 30 at opposite ends of the shaft 25 and likewise the wheels 26 are rotatably mounted upon similar coaxial eccentric bearing extensions 31. The eccentric cylindrical extensions 30 and 31 are smaller than the cylindrical bodies of the respective shafts. Opposite end portions of the larger cylindrical bodies of shafts 25 and 27 are rotatably mounted in end portions of parallel bars 35, which space the shafts laterally in parallel relation inwardly of the mounting of the wheels 24 and 26.

A forward cutter holder 36 which includes two parallel beams 37 extends between and parallel to the shafts 25 and 27 nearer the shaft 25, and the holder ends are rigidly secured to the bars 35 by means of bolts 39. The parallel beams 37, which are notched to receive the bars 35 and are mounted edgewise thereon, are spaced by one of the bolts 39 in each bar. The bolts 39 extend substantially vertically between the beams. This cutter holder is designed to support forward cutter units 40 which are provided with lateral extensions 41 fitted above and below the holder and through which the bolts 42 are secured and clamp the cutter units rigidly thereon. The bolt 42 of each cutter unit can be independently loosened to permit horizontal adjustment of any unit 40 to any desired position along the holder.

Likewise, a rear cutter holder 46 in the form of parallel beams 47 extends between and parallel to the shafts 25 and 27 nearer the shaft 27, and the holder ends are rigidly connected to the bars 35 by means of bolts 49. The parallel beams 47, which are notched to receive the bars 35 and are mounted edgewise thereon, are spaced by one of the bolts 49 in each bar 35. The bolts 49 extend substantially vertically between the beams. This cutter holder 46 is designed to support rearward cutter units 50 which are provided with lateral extensions or flanges 51 fitted above and below the holder and through which bolts 52 are secured to clamp the cutter units thereon. The bolt 52 of each cutter unit can be independently loosened to permit adjustment of any unit 50 horizontally to any desired position along the holder. Lower clamping plates 53 arranged parallel to the bars 35 traverse the lower end portions of the beams 37 and 47 to receive the lower ends of the bolts 39 and 49 in screw-threaded relation.

The beam ends are thus clamped by these bolts between the plates 53 and bars 35. Sprocket wheels 54 rigidly mounted upon the shafts 25 and 27 are connected by a chain 56 trained thereabout to insure rotation of the shafts in unison.

Referring to Figs. 8, 9 and 10, it is to be noted that the cutter units are of the same construction, and each unit 40 or 50 includes vertical parallel side plates 60 bolted, as indicated at 61, upon opposite sides of an upright spacer bar 62 upon which the clamping flanges 41 are welded. An upper guide plate 64 is welded between the plates 60 and upon the upper end of the bar 62 and is formed with a slot 65 leading from its central portion outwardly through the plate edge.

A hollow cutter stem 67 of rectangular cross section fits slidably between the side plates 60, and between the spacer bar 62 and a pair of spacer rivets 69, the latter of which are rigidly mounted in the plates at positions equally spaced from the bar 62. The hollow stem is thus slidably guided between the side plates 60 and is further guided by the bar 62 and rivets 69.

A handle 70 rigidly secured to the upper end of the stem 67 normally rests against the upper spacer rivet 69 which limits downward movement of the stem as it is guided between the side plates. A plug 71 is slidably mounted in the hollow stem, and a compression spring 72 inside the stem presses at its upper end against the lower end of the plug and its lower end abuts against the inner bottom wall of the stem. The upper end of the plug 71 has an indentation 74 formed therein to receive a pointed end of a bolt 75 which is screw-threaded through a block 76 and which is normally disposed coaxially with respect to the stem 71. The bolt 75 fits in the slot 65 and can be adjusted in the block 76 to impose whatever tension that may be desired in the coil spring 72. The bolt and plug can be removed and snapped back into place in the unit as indicated in the broken lines of Fig. 9. After the bolt 75 has been removed the stem 67 can be removed by manipulating the handle 70.

The lower end of the stem 67 is provided with a wheel cutter 80 rotatably mounted upon a bight portion of a resilient U-shaped pin 81 which is removably sprung into openings 82 formed in the lower end of the stem. The cutter elements are thus readily demountable and the cutter wheel can be quickly replaced.

Referring to Figs. 1 and 3, it will be observed that the carriage 23 is in a neutral position and in such position the axes of the shafts 25 and 27, including their eccentric bearing extensions 30 and 31, are all disposed in substantially the same horizontal plane. Also, the major axes of the shaft portions corresponding to the axes of rotation thereof in the bars 35 are in positions of maximum spacing. By manipulating a handle 85 that is rigidly secured upon the shaft 27, the major axes or bearing axes of the portions of the shafts mounted in the bars 35, can be raised or lowered, thereby raising or lowering corresponding ends of the bars 35 and transmitting like movement to the cutter units 40 and 50. By moving handle 85 90° in a counter-clockwise direction (Fig. 3) from its neutral full line position to its lower position (Fig. 4), the body of the shaft 27 is lowered and the body of the shaft 25 is concurrently raised in a similar manner by transmission of movement from shaft to shaft through the sprocket and chain gear 54—54. By throwing the handle 85 in a clockwise direction to the position shown in Fig. 6, the shaft 27, together with the rear cutters 50, is raised and the forward cutters 40 are concurrently lowered.

In operating the apparatus a sheet of glass 90 is centered by means of blocks 91 secured by welding, or the like, upon a table 92, the latter of which is rotatably mounted, as indicated at 94, upon a circular support 95 to insure rotation thereof about a vertical axis and to maintain the table in a level position. The glass is thus disposed on the table in a plane over which the carriage 23 travels. By manually operating the carriage upon the tracks 21 the rearward row of cutter units 50 can be positioned directly above the front edge of the glass. The handle 85 is then lowered from neutral position to the position shown in Fig. 4 to place the cutter units 50 upon the glass in opposition to the action of the springs 72 in the cutter stems 67. The carriage is then pulled rearwardly and each cutter of the units 50 scores or cuts the glass. At the completion of the rearward stroke the handle 85 is moved to its neutral position to free the cutters from the glass. The table 92 is then rotated 90°. After the forward cutters 40 have been positioned above the rear edge of the glass the handle 85 is again operated to lower the forward cutter units 40 upon the glass and the carriage is returned forwardly to the position shown in Fig. 1. During this forward return stroke the forward cutter units 40 score or cut the glass at right angles to the first scoring lines. The rectangular contour of the glass pieces thus cut depends upon the relative spacing of the rows of cutter units 40 and 50 on the holders. In the movement of the carriage 23 in connection with the eccentric rotation of the shafts 25 and 27, the carriage may be said to be tiltable in opposite directions to bring the forward and rearward rows of cutters alternately into cutting position on the glass.

Although only one form of the invention has been shown and described in detail it will be apparent to those skilled in the art that the invention is not so limited but that various changes can be made therein within the spirit of the invention and within the scope of the appended claims.

I claim:

1. A cutting apparatus comprising track means disposed linearly, a frame having means supporting it in linearly movable relation on said track means and said frame having means holding it tiltably transversely of the direction of its linear movement for alternately guiding forward and rearward portions of the frame toward and away from a plane of cutting, and two rows of cutter units mounted respectively on the forward and rearward portions of the frame and responsive to tilting action of the latter for alternately disposing the rows of cutters in the plane of cutting.

2. A cutting apparatus comprising track means disposed linearly, a frame having means supporting it in linearly movable relation on said track means and said frame having means holding it tiltably transversely of the direction of its linear movement for alternately guiding forward and rearward portions of the frame toward and away from a plane of cutting, cutter holders in the form of rails disposed upon forward and rearward portions of the frame, a row of cutter units mounted in spaced relation along each rail, and releasable clamping means securing each cutter unit adjustably on its rail.

3. A cutter apparatus comprising a carriage linearly movable forwardly and rearwardly across a plane of cutting in which sheet glass is adapted to be supported, track means supporting the carriage in its linear movement, said carriage including a frame tiltable transversely of the direction of its linear movement to alternately move forward and rearward portions of the carriage toward and away from the plane of cutting, and two rows of cutter units mounted respectively on the forward and rearward portions of the frame and responsive to tilting action of the latter for alternately engaging the rows of cutter units with the glass.

4. A cutter apparatus comprising a carriage linearly movable forwardly and rearwardly across a plane of cutting in which sheet glass is adapted to be supported, track means supporting the carriage in its linear movement, said carriage including a frame tiltable transversely of the direction of its linear movement to alternately move forward and rearward portions of the carriage toward and away from the plane of cutting, and two rows of cutter units mounted respectively on the forward and rearward portions of the frame and responsive to tilting action of the latter for alternately engaging the rows of cutter units with the glass, the cutter units of the two rows being selectively mountable in spaced relation along the forward and rearward portions of said frame.

5. In a cutting apparatus, a carriage linearly movable forwardly and rearwardly across a plane of cutting in which sheet glass is adapted to be supported, linear track means, guide members for supporting the carriage in the track means, forward and rearward portions of the carriage including spaced shafts disposed transversely of the track means, each shaft having eccentric bearing portions mounted in said guide members and in their neutral position supporting the carriage substantially horizontally, actuating means connected to the shafts to rotate them concurrently, and rows of cutter units mounted adjacent forward and rearward portions of the carriage and responsive to the rotation of the shafts on their eccentric bearing portions to move toward and away from the plane of cutting.

6. In a cutting apparatus movably forwardly and rearwardly across a plane of cutting in which sheet glass is adapted to be supported and including track means to support the apparatus in its linear movement, parallel spacing bars normally disposed in substantially a common horizontal plane, two parallel shafts rotatably mounted in the spacing bars transversely thereof and forming therewith a frame structure, means connected to the shafts for rotating them in unison, each of said shafts having means supporting it eccentrically and the latter means being carried upon the track means, and cutter units supported on the frame structure and disposed in two rows respectively parallel to the two shafts, said two rows being disposed respectively adjacent the two shafts and movable alternately into and out of cutting position in response to rotation of the shafts in their eccentric supporting means.

WILLIAM OWEN.